(12) United States Patent
Frayer et al.

(10) Patent No.: US 6,268,425 B1
(45) Date of Patent: Jul. 31, 2001

(54) GLASS/POLYMER MELT BLENDS

(75) Inventors: Paul D. Frayer; Roy J. Monahan; Michelle D. Pierson, all of Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/229,379

(22) Filed: Jan. 11, 1999

Related U.S. Application Data

(63) Continuation-in-part of application No. 08/883,775, filed on Jun. 27, 1997, now Pat. No. 6,103,810, which is a continuation-in-part of application No. 08/724,627, filed on Oct. 1, 1996, now abandoned, which is a continuation-in-part of application No. 08/724,626, filed on Oct. 1, 1996, now abandoned.

(51) Int. Cl.⁷ ..................................................... C08K 3/40
(52) U.S. Cl. .......................... 524/494; 523/214; 523/217; 523/444
(58) Field of Search ............................. 524/494; 523/214, 523/217, 244; 428/34.5; 264/143; 65/66

(56) References Cited

U.S. PATENT DOCUMENTS

| | | |
|---|---|---|
| 3,732,181 | 5/1973 | Ray et al. . |
| 3,885,973 | 5/1975 | Ray et al. . |
| 3,926,649 | 12/1975 | Ray et al. . |
| 3,935,018 | 1/1976 | Ray et al. . |
| 3,964,919 | 6/1976 | Ray et al. . |
| 5,043,369 | 8/1991 | Bahn et al. . |
| 5,328,613 | 7/1994 | Beall et al. . |
| 5,367,012 | 11/1994 | Aitken et al. . |
| 5,507,990 * | 4/1996 | Bookbinder et al. ................. 264/143 |
| 5,693,700 | 12/1997 | Venkataramani ..................... 524/405 |
| 5,711,779 | 1/1998 | Havewala ............................ 65/134.1 |
| 5,916,649 * | 6/1999 | Hegemann et al. ................. 524/494 |

* cited by examiner

Primary Examiner—James J. Seidleck
Assistant Examiner—Olga Asinossky
(74) Attorney, Agent, or Firm—Angela N. Nwaneri; Peter Rogalskyj

(57) ABSTRACT

This invention is directed to the preparation of alloy articles consisting essentially of 65 wt. % or more glass and high temperature organic thermoplastic or thermosetting polymers having working temperatures which are compatible with that of the glass and/or the precursor glass for the glass-ceramic. The glass and polymer are combined at the working temperature to form an intimate mixture; i.e., the glass and polymer are in a sufficiently fluid state to be blended together to yield a body exhibiting an essentially uniform, fine-grained microstructure wherein, desirably, there is at least partial miscibility and/or a reaction between the glass and the polymer to promote adhesion and bonding therebetween. A body is shaped from the mixture and cooled to room temperature.

20 Claims, No Drawings

GLASS/POLYMER MELT BLENDS

FIELD OF THE INVENTION

This application is a continuation-in-part of U.S. Ser. No. 08/883,775 filed Jun. 27, 1997, now U.S. Pat. No. 6,103,810, entitled Glass/Polymer Melt Blends, which is a continuation-in-part of U.S. Ser. No. 08/724,627 filed Oct. 1, 1996, now ABN entitled "Glass Amorphous Polymer Melt Blends" and U.S. Ser. No. 08/724,626 filed Oct. 1, 1996, now ABN entitled "Glass/Polymer Tri-Blends". This invention relates to glass-polymer blends containing low temperature glasses and at least two high temperature polymers.

BACKGROUND OF THE INVENTION

It is generally known that low temperature polymers can be made more heat stable by blending such polymers with higher temperature polymers to form a polymer composite or alloy. Polymer composites are typically prepared from materials of two separate origins by dispersing one solid phase in a continuous matrix of another phase. Mostly, polymer composites consist of a base polymer reinforcing fibers, fillers, and/or whiskers. In addition, polymer composites may contain additives such as plasticizers, colorants, flame retardants, as well as stabilizers against heat and/or sunlight.

In the preparation of polymer blends, in addition to one phase being fluid as with conventional composites, the second phase can also be fluid, either as a melt or as a polymerizing monomer. Also, unlike conventional polymer composites, in blends, phase reversal or inversion may be achieved, depending on the relative concentrations and viscosities of the two polymers. Thus, from a state wherein one component is continuous in phase, a polymer blend can comprise a system which is continuous with respect to the second phase or one in which both phases are continuous such that one component can become enclosed in the second component and vice versa. Accordingly, where the properties of the two polymers are widely different, extreme changes in mechanical behavior can be experienced in the resulting blend.

Blends and alloys consisting of a combination of two or more polymeric resin systems where at least one of the polymers is present in a concentration greater than 5% by volume are well known to the art. As stated above, blends are mixtures of two or more resins which are blended, customarily in the molten state, to form new materials. Unlike copolymers, grafts, or interpenetrating polymer networks, no chemical synthesis or formation of new covalent bonds need occur. Blends have been designated as either miscible or immiscible depending upon the number of phases present.

Miscible or soluble blends comprise one phase with one glass transition temperature (Tg), wherein individual polymer segments are intimately blended with some specific chemical or physical attraction taking place between dissimilar polymer chains, e.g., hydrogen bonding or donor-acceptor. In contrast, immiscible blends consist of two or more discrete phases (continuous and disperse) of two or more Tgs. Completely immiscible blends have limited product potential because of lack of adhesion at the polymer interface. Compatibilizers may be added to such blends to make useful alloys.

Most commercially-marketed resin alloys are formed via some type of melt mixing utilizing a continuous-type intensive mixer or an extruder. In this process, two or more polymers in pellet or powder form are generally premixed or metered into an extruder (a single screw or a multiscrew), or into a continuous-type intensive mixer, fluxed for a brief period, and then shaped into pellets from strands or diced from sheets.

Inorganic glasses can exhibit many desirable properties; for example, high elastic modulus, abrasion resistance, stain resistance, thermal stability, inertness to solvents, low coefficient of thermal expansion, and low permeability to moisture and gases. On the other hand, organic polymers which are generally known to be poor in the above properties, can demonstrate such advantageous characteristics as high elasticity, flexibility, toughness, light weight, and ease in shaping, which properties are generally lacking in inorganic glasses.

Glass/polymer blends attempt to combine the properties of inorganic glasses and those of organic polymers. Glass polymer composites, which may be regarded as multi-phase materials of two or more components in which the polymer comprises the continuous phase, can be considered as containing glass fillers or reinforcing agents. Filled plastic products customarily consist of organic polymers enveloping discrete organic or inorganic particles, flakes, fibers, whiskers, or other configurations of materials. These filler materials may be incorporated principally for the purpose of reducing the overall cost of the product without seriously undermining the properties of the polymer. Similarly, the filler materials may be included to impart some improvement to a particular physical property exhibited by the polymer. For example, ceramic and glass fibers have been entrained in polymer bodies to provide reinforcement to the composites. The strength demonstrated by those products is primarily dependent upon mechanical bonding between the inorganic fibers and the organic polymers as well as alignment of the reinforcement in the test direction.

In recent years, composite bodies consisting of inorganic glasses exhibiting low transition temperatures and organic polymers have been disclosed which exhibit the combined properties of glasses and polymers. For example, U.S. Pat. No. 3,732,181 describes seven general methods by which glass in the form of fibers, films, flakes, powders, or sheets is combined with a polymer to form a composite mixture which can be formed into a desired configuration through a variety of shaping means. As disclosed therein, the ratio of polymer-to-glass may range from 0.1:99.9 to 99.9:0.1 on a volume basis, but more typically, about 5–66% by volume. The reference also discloses three broad glass compositions exhibiting properties which render the glasses suitable for use in glass-plastic composite articles, namely:

(a) $PbO+P_2O_5 \geq 95$ mole %, wherein PbO constitutes 20–80 mole %;

(b) $PbO+R_2O$ (alkali metal oxides)$+\geq 95$ mole %, wherein PbO comprises 5–60 mole %, $R_2O$ constitutes 5–35 mole %, and $P_2O_5$ is present up to 85 mole %; and (c) $PbO+R_2O+B_2O_3+P_2O_5 \geq 95$ mole %, wherein PbO comprises 5–30 mole %, $R_2O$ constitutes 5–30 mole %, $B_2O_3$ comprises 5–20 mole %, and $P_2O_5$ makes up 15–85 mole %.

U.S. Pat. Nos. 3,885,973; 3,935,018; 3,964,919 and 3,926,649 disclose glasses which may be suitable for co-processing with organic polymers to form composite articles of the type discussed in detail in U.S. Pat. No. 3,732,181 supra.

Recently, U.S. Pat. No. 5,043,369, herein incorporated by reference, has disclosed a glass/polymer blend wherein the glass phase and the polymer phase are co-continuous, with the particles of each phase being simultaneously enclosed within larger regions of another phase (i.e., localized phase inversion/reversal.) In this patent, the glass and polymer demonstrate at least partial miscibility and/or a reaction there-between such that the two components are intimately blended together. It is believed that the blend results in the formation of a compatibilizing component in-situ to yield an alloy. Also, the glass/polymer blend of this reference exhibits an essentially uniform, fine-grained microstructure wherein the glass and polymer elements comprising the microstructure are of relatively uniform dimensions. The reference patent discloses a phosphate-based glass within two general narrow composition regions which are essentially non-hygroscopic and exhibit good resistance to chemical and moisture attack, and which can interact with a variety of polymers to produce alloy articles.

More recently, U.S. Pat. No. 5,328,613 (Beall et al.) disclosed semi-permeable microporous polymer bodies made from durable high-temperature thermoplastics and subsequently leaching the glass out of the polymer to create a continuous polymer network. Also, U.S. Pat. No. 5,367,012 (Aitken et al.) has recently disclosed an alloy comprising at least one organic thermoplastic or thermosetting polymer, at least one phosphate glass, and a water soluble stabilizer to provide a source of metal cations.

There continues to be a need for cost-effective, durable, flame-retardant glass polymer compositions having essentially uniform, fine-grained microstructure wherein the glass and polymer elements comprising the microstructure are of relatively uniform dimensions. There also continues to be a need for composite articles having a high surface smoothness. For such articles, the particle size must be as small as possible, preferably on the order of micron scale or less.

SUMMARY OF THE INVENTION

Briefly, the invention relates to blends of low temperature softening glasses and a plurality of high temperature aromatic thermoplastic or thermosetting polymers which can be used to produce durable, dimensionally stable and injection moldable articles, and to glass/polymer blends which exhibit essentially uniform, fine-grained microstructure in which preferably, the glass and polymer elements comprising the microstructure are of relatively uniform dimensions, and in which the glass interacts with the polymers to form alloys exhibiting a combination of the desirable properties of the glass and the polymers.

In one aspect, the invention relates to glass-polymer blends containing at least two high temperature polymers; preferably using a mixed-alkali-zinc-pyrophosphate glass, which blends exhibit excellent mechanical properties and flame retardance. The desirable properties of the glass-polymer blend of the invention are obtained by controlling the microstructure of the blend. It is generally known that fine glass microstructure (generally, less than 1 micron, with the largest particles being in the range of 1–5 microns), results in high flexural strength (greater than or equal to 20 kpsi), while coarse microstructure (i.e., about 20 microns) results in an increase in flame retardance. The inventive melt blends combine both flexural strength and flame retardance properties.

In a particular aspect, the invention relates to glass-polymer blends such as described above, having at least 65 wt. % glass loading and exhibiting excellent mechanical and flame retardance properties.

In a further aspect, the invention relates to a method of forming glass/polymer articles exhibiting an essentially uniform, fine-grained microstructure and having both good dimensional stability in three directions, as well as good flame retardance by:

(a) high shear dispersive mixing of finely-divided bodies of an inorganic glass and at least two organic thermoplastic or thermosetting polymers at a temperature and viscosity represented by the working temperature of the glass and polymers to form a glass polymer mixture; and (b) shaping the mixture into an article of a desired configuration.

In still another aspect, at least one of the organic thermoplastic or thermosetting polymer acts as a processing aid for ease of processing of the glass/polymer blend.

In still a further aspect, the invention relates to a high glass loading glass/polymer blend having at least three polymers, at least one of which functions as a processing aid.

As used herein:

"high glass loading" means that the blend contains at least 65 wt. % glass;

"good dimensional stability" means that the blend exhibits thermal expansion in three directions (x,y,z) no greater than 95 $\mu$m/m ° C., preferably less than 90 $\mu$m/m° C.; also, the ratio of the thermal expansion in the x,y directions is less than 2.0, and more preferably in the range of 1 to 2.0;

with respect to glass, "essentially non-hygroscopic" indicates that the glass component will demonstrate a weight gain of less than $1 \times 10^{-6}$ grams/cm$^2$/minute when exposed at 40° C. to a relative humidity of 80%;

"blend" and "alloy" are used as such terms are defined by Leszek A. Utracki, in *Polymer Alloys and Blends*, (1990), Part 1, pgs. 1–3; thus, a "polymer blend" is a mixture of at least two polymers or copolymers, and an "alloy" is an immiscible polymer blend having a modified interface and/or morphology;

"excellent mechanical properties" means that the blend, among other things, exhibits thermal expansion in three directions (x,y,z) no greater than 95 $\mu$m/m ° C., preferably less than 90 $\mu$m/m° C.; also, the ratio of the thermal expansion in the x,y directions is less than 2.0, and more preferably in the range of 1 to 2.0; and sometimes the term "tri-blend" is used broadly for the sake of brevity to describe the inventive blend and is used to indicate that the blend contains at least three components—glass and at least two polymers; this use is intended to distinguish the present blend from known single polymer glass blends. In reality, the inventive blend can contain more than three components as in blends containing glass and three polymers.

DETAILED DESCRIPTION OF THE INVENTION

The object of the present invention, that is, to provide a high glass loading glass/polymer blend having acceptable flexural strength, flame retardance and processability, is achieved by mixing glass with at least two organic thermoplastic or thermosetting polymers to form a glass/polymer blend, and optionally, shaping such blend to form a glass/polymer article.

Any glass having the following essential characteristics may be useful for the practice of the present invention, namely: (1) a sufficiently low Tg to be thermally co-deformable with organic polymers; (2) the capability of interacting with a polymer so as to form bodies having essentially uniform, fine-grained microstructures and to desirably produce at least partial miscibility between the glass and polymer and/or a reaction and/or an attraction force between the glass and the polymer to promote adhesion and/or bonding therebetween; and (3) exhibit excellent resistance to attack by moisture, that is, the glass must be essentially non-hygroscopic.

We have discovered that the most desirable glasses for the inventive glass-polymer blends in terms of glass stability, chemical durability, and low working temperatures are the mixed-alkali zinc-pyrophosphate glass compositions. Certain glass compositions are preferred for their adhesion to specific resin types.

Examples of preferred glass and glass-ceramics for the invention are disclosed in U.S. Pat. Nos. 4,920,081; 4,940,677; 4,996,172; and 5,328,874 (all herein incorporated by reference).

Phosphate-based glasses have been shown to be particularly suited for glass-polymer alloys or blends due to their low transition temperatures. In addition, unlike silicates, borates, and most other glass formers, phosphorus does not form carbides. Phosphate-based glasses exhibit higher coefficients of thermal expansion, matching the thermal expansion of some commercial polymers; and they are known to dissolve significant concentrations of hydrogen, ammonium, and sulfide ions, as well as organics.

The '081 patent discloses glasses consisting essentially in mole percent, of 44–58% $P_2O_5$, 0–7% $Al_2O_3$, 0–10% $B_2O_3$, 4–10% $Al_2O_3+B_2O_3$, 0–30% $Li_2O$, 10–30% $Na_2O$, 10–45% $Li_2O+Na_2O$, 0–20% $Cu_2O$, and 10–30% $Li_2O+Cu_2O$. The '677 patent discloses glasses consisting essentially, in mole percent, of 10–35% $R_2O$, wherein $R_2O$ consists of at least two alkali metal oxides in the indicated proportions selected from the group consisting of 0–25% $Li_2O$, 0–25% $Na_2O$ and 0–25% $K_2O$, 12–55% ZnO, and 28–40% $P_2O_5$. Other glass compositions useful for the practice of the present invention include glass compositions which, when heat treated, can be crystallized in situ to glass-ceramic articles wherein a lithium-, zinc-, and/or lead-containing phosphate constitutes the predominant crystal phase. Examples of such glass compositions are described in the '724 patent and consist essentially, in mole percent, of 5–25% $Li_2O$, 0–15% $Na_2O$, 0–10% $K_2O$, 5–25% $Li_2O+K_2O$, 35–50% ZnO, 0–15% PbO, 0.75–6% $Al_2O_3$ and 29–37% $P_2O_5$.

Finally, U.S. Pat. No. 4,996,172, (also herein incorporated by reference), discloses compositional modifications in the glass compositions of the '677 patent resulting in glasses of even greater resistance to chemical and moisture attack. The glasses described therein consist essentially, in mole percent, of 10–35% $R_2O$, wherein $R_2O$ consists of at least one alkali metal oxide in the indicated proportion selected from the group consisting of 0–25% $Li_2O$, 0–25% $Na_2O$ and 0–25% $K_2O$, 12–55% ZnO, 28–45% $P_2O_5$, and 0.5–5% total of $Y_2O_3$ and/or at least one oxide of a rare earth metal selected from the lanthanide group.

The preferred glass compositions are those having the following composition: 30–36 mole % $P_2O_5$, 30–49 mole % ZnO, 0–10 mole % SnO, 12–25 mole % alkali as $M_2O$ (where $M_2O$ consists of at least two alkali metal oxides in the following proportions, 3–12% $Li_2O$, 4–13% $Na_2O$, and 0–12% $K_2O$), 1–3.5 mole % $Al_2O_3$, 0–2 mole % $SiO_2$, 0.5–3 mole % $Re_2O_3$, and 0–5 mole % of the combination of CaO+MgO+F. The preferred range of sulfophosphate glasses as described in the '874 patent is 21–33% $P_2O_5$, 9–17% $SO_3$, 35–51% ZnO, and 10–20% $M_2O$ (where $M_2O$ is as defined above).

More preferably, the glasses and/or precursor glasses used for the present invention exhibit transition temperatures below 380° C. most preferably above about 300°. Illustrative examples of such glasses are shown in Table 1 below. Because the sum of the constituents totals or closely approximates 100, for all practical purposes the individual values reported may be deemed to represent weight percent on the oxide basis. The actual batch ingredients may be any materials, either oxides or other compounds, which, when melted together, will be converted into the desired oxide in the proper proportions. For example, $Na_2O$, $K_2O$, and BaO, may be $Na_2CO_3$, $K_2CO_3$, and $BaCO_3$, respectively.

TABLE 1

|  | Glass A | Glass B | Glass C | Glass D | Glass E | Glass F | Glass G | Glass H | Glass I | Glass K | Glass W | Glass Y |
|---|---|---|---|---|---|---|---|---|---|---|---|---|
| $Al_2O_3$ | 4 | — | 2 | 2.3 | 2 | 2 | 1.5 | 1.6 | 1.16 | 1.5 | 1 | 1.1 |
| $Na_2O$ | 25 | 13 | 7 | 9.4 | 8.1 | 7 | 8 | 9.3 | 6.08 | 8.0 | 8.0 | 9.4 |
| $Li_2O$ | 25 | — | 7 | 8.1 | 6.9 | 6 | 5.3 | 4.8 | 2.31 | 5.3 | 5.8 | 7.6 |
| $K_2O$ | — | — | 7 | 5.8 | 4.8 | 7 | 5.8 | 6.9 | 4.86 | 5.8 | 5.3 | 5.1 |
| $Cu_2O$ | — | — | — | 16.3 | — | — | — | — | — | — | — | — |
| (Cu+/Cu) |  |  |  | (3.4%) |  |  |  |  |  |  |  |  |
| $SiO_2$ | — | — | — | — | — | 2 | — | — | 0.60 | — | — | 1.0 |
| $P_2O_5$ | 46 | 32.2 | 33 | 38.8 | 32.8 | 33 | 24.8 | 19.5 | 47.76 | 24.8 | 24.8 | 32.2 |
| $SO_3$ batch/analyzed | — | — | — | — | — | — | 12.5 | 20/19.9 | — | 12.5 | 13.5 | — |
| ZnO | — | 54.8 | 44 | — | 40 | 43 | — | 43 | 35.06 | 40.7 | 39.2 | 41.5 |
| SnO | — | — | — | — | 5.4 | — | — | — | — | — | — | — |
| CaO | — | — | — | — | — | — | 0.7 | 1.6 | 0.58 | 0.7 | 0.7 | 1.0 |
| SrO | — | — | — | — | — | — | 0.7 | 1.3 | — | 0.7 | 0.7 | — |
| BaO | — | — | — | — | — | — | — | — | 1.58 | — | — | — |
| $WO_3$ | — | — | — | — | — | — | — | — | — | — | 1 | — |
| Tg | 300° C. | 375 | 330 | 235 | 315 | 344 | 265 | 250 |  | 300 | 317 | 333 |
| Working Temp. | 350° C. |  |  | 300 | 385 | 415 | 315 | 300 |  |  |  |  |
| Water Dur. @ 95° C. g/cm²/min | soluble | $3 \times 10^{-7}$ |  | $1 \times 10^{-6}$ | $2 \times 10^{-7}$ | $2 \times 10^{-7}$ | $3 \times 10^{-7}$ | $6 \times 10^{-6}$ |  |  |  |  |
| nD |  | 1.497 |  | 1.623 | colored | 1.580 | 1.554 |  |  |  |  |  |

Glasses K and W are durable sulfophosphate glasses; while glass Y is a tin-free, alkali-zinc-phosphate glass. To recover sufficient amounts of the glasses, the K and W glasses are sieved to −12 mesh, while the Y glass is sieved to −12 to +80 mesh. Prior to extrusion the glasses are dried overnight at 150° C. in a circulating air oven. Generally, the maximum sieving size will depend on the process capabilities such as the size of the melt blender.

Any commercially available thermoplastic and certain high temperature thermosetting polymers which have suitable processing temperatures may be used for the glass-polymer blends of the invention. Examples of useful thermoplastic polymers include polyarylether ketones, polyphenylene sulfides, polyfluoro resins, polyetherimides, liquid crystal polyesters, polysulfones, polyarylsulfones, polyphenylsulfones, polyethersulfones, polytetrafluoroethylenes, high temperature polycarbonates, polyimides, aromatic polyketones such as polyetherketones (PEK), polyetherketoneketone (PEKK), polyetherketoneetherketoneketone (PEKEKK), polyetheretherketoneketone (PEEKK), polyetheretherketoneetherketone (PEEKEK), polyetheretheretherketone (PEEEK), and polyetheretherketones (PEEK). Examples of high temperature thermosetting resins include epoxy resins, phenolics, diallyl phthalates, silicone resins, and polyimides. The most suitable glass/polymer combination for a given application may best be determined by experimentation.

The preferred polymers for the glass/polymer blends of the invention are, the aromatic polyketones, polysulfones such as Radel$^R$ A (a polyarylethersulfone), Radel$^R$ R (a polyphenylsulfone), both available from Amoco Performance Products, Inc., polyphenylsulfone, and polyetherimide resins such as Ultem$^R$, available from General Electric. Other useful high temperature polymers include, ULTRASON$^R$ S (a polysulfone) and ULTRASON$^R$ E (a polyethersulfone), both available from BASF, and Toatsu TPI$^R$ (a thermoplastic polyimide available from Mitsui.) Both Ultem$^R$ and Radel$^R$ are amorphous polymers which may be used to form transparent glass/polymer articles.

Two different polyetherimide (Ultem) polymers were tested. Both Ultem 1000 and Ultem 6000 exhibit high viscosities which account for difficult processing properties at high glass loadings. While Ultem 6000 has a higher molecular weight than Ultem 1000, and is more thermally stable, it is also more difficult to process. Ultem 1000 exhibits high dielectric strength, good chemical resistance, high heat resistance, good flame resistance, and excellent strength (21,000 psi flexural strength, and 15,000 psi tensile strength.)

Polysulfones such as the RADEL brands offer excellent toughness, high heat deflection temperature, good electrical properties, high resistance to steam and boiling water temperatures, and good creep resistance.

Earlier work by the inventors revealed that certain high melt viscosity amorphous polymers couldn't be readily made into blends with high loadings of phosphate glasses. In many of the experiments, attempts to form blends of these polymers with high loadings (greater than 65 wt. %) of phosphate glasses tended to generate too high a torque on the compounding machine. In addition, excessive pressures and temperatures were generated in the processing machines making it impossible to process the blends. These excessive conditions would in turn lead to unacceptable degradation of the polymer during processing. Our search for a solution to this problem led to the instant invention. We discovered unique combinations of polymers which can be combined with phosphate glasses in significantly higher glass loadings than previously possible. Some of these glass/polymer combinations were miscible (i.e., clear in the solid state), while others immiscible (translucent in the solid state). In particular, we discovered a unique process for making glass/polymer blends with high viscosity amorphous polymer blends of significantly high glass loadings without the high torque, high pressure, and excessive temperature build-ups of the prior art. In the inventive method, the process conditions (torque, temperature and pressure) can all be controlled to avoid unacceptable degradation of the polymer. Using the instant method, we have also been able to form glass/polymer blends using polymers which were hitherto impossible to blend with phosphate glasses.

The main object of glass polymer blends is to combine the properties of the glass with those of the polymers. As stated above, single polymer, glass-polymer blends are known which combine some advantageous properties of both the glass and the polymer. However, in phosphate glass-polymer (single polymer) blends, it is typical to see both flexural and tensile strengths decrease as the glass loading increases. This is illustrated in the two-component (single polymer) systems of Table 2, using sulfophosphate glasses (Glasses K and W), and zinc phosphate glass (Glass Y), all of which compositions are given in Table 1 above.

TABLE 2

| | \multicolumn{6}{c}{(Comparative Examples)} | | | | |
|---|---|---|---|---|---|---|
| | K/ULTEM (wt. %) | | Y/ULTEM (wt. %) | | W/ULTEM (wt. %) | K/RADEL (wt. %) |
| | 50/50 | 65/35 | 50/50 | 65/35 | 65/35 | 50/50 |
| MECHANICALS | | | | | | |
| Flex PSI | 17284 | 14091 | 16029 | 14073 | 17271 | 10983 |
| Modulus MPSI | 0.8 | 0.8 | 1.03 | 1.17 | 1.15 | 0.76 |
| % Strain Peak Load | 2.8 | 1.6 | 2.1 | 1.3 | 1.7 | 2.6 |
| Tensile PSI | 9659 | 9188 | 8174 | 9271 | 9539 | 5083 |
| Modulus KSI | 808 | 1118 | 1060 | 1230 | 1042 | 768 |
| % Strain Break | — | 0.972 | 1.01 | 0.853 | 1.048 | 1.68 |
| Notched Izod | 0.562 | — | — | 0.352 | 0.345 | — |
| Limiting Oxygen Index | 57% | 62% | 68% | 85% | 68% | 53% |
| Expansion in 3D at 150° C. µm/m ° C. | 121.4 | 108.6 | 109.9 | 98.9 | 119.9 | 135.6 |

At a glass loading of 50 weight %, these single polymer blends exhibited a fine grain morphology in which glass spheres measuring less than 10 microns in size are uniformly dispersed through the polymer matrix. A comparison of the 50/50 blends of the K glass with Ultem and Radel, shows higher flexural and tensile strengths for the Ultem blend than for the Radel blend. Without intending to be bound by theory, it is believed that the higher strength of the K/Ultem blend is due to the fact that Ultem has a higher mechanical strength and viscosity than Radel. As a result of the high viscosity of Ultem however, higher glass loadings with this polymer are difficult to process by injection molding or by mold filling techniques. Ultem also results in blends having a lower glass/polymer adhesion than is observed in a blend using Radel. Scanning electron micrographs of a K/Ultem blend, show small glass spheres in the polymer matrix. This microstructure, showing little or no adhesion, is referred to herein as a "ball and socket" microstructure.

It is generally expected that in a single polymer/glass blend, as the glass loading increases, melt temperature has to be increased in order to lower torque and produce the desired microstructure. Thus, for the K glass/Ultem blend, as the glass loading increases from 50 to 65 wt. %, the tensile strength decreases from 9659 psi to 9188 psi, while the flexural strength decreases from 17284 psi to 14091 psi. A similar trend is observed for the Y/Ultem blend where the flexural strength decreased from 16029 to 14073 psi as the glass loading is increased from 50 to 65 wt. %. In addition to the processing limitations described above, poor adhesion is also a major disadvantage of a single polymer glass/Ultem blend. Scanning electron micrographs of the Ultem blends of Table 2, show small glass spheres resting on the Ultem matrix. There is little or no evidence of adhesion in the microstructure. This type of microstructure is termed "ball and socket." Scanning electron micrographs of a 50/50 (wt. percent) K/Radel blends show that unlike what is observed in the K/Ultem blends, the K/Radel blends exhibit good glass polymer adhesion. However, as the glass loading is increased from 50 to 70 wt. %, glass coalescence is observed and physical properties become increasingly unacceptable.

Surprisingly we have found that RadelR A, when added to the glass/Ultem$^R$ blends of Table 2, tends to act as a processing aid. For example, in one example, a 65/35 wt. %, glass/Ultem$^R$ blend required a torque of 55 to 65% and a pressure of 500 psi to process using an 18 mm Leistritz twin-screw extruder. When Radel$^R$ A was added to form a higher glass loading blend of 70 wt % glass, 10 wt. % Radel$^R$, and 20 wt % Ultem$^R$, the torque decreased to 41%, and the pressure fell to 470 psi. In addition, the Radel$^R$-containing tri-blend required the same or lower extrusion temperatures to process than the single polymer blend. In the single polymer blend, it is necessary to increase both the melt temperature and work in order to process higher glass loadings.

Melt temperature is a function of the work put into the blend, and the equipment temperature. High melt temperatures are generally undesirable because as temperature increases, the risk of polymer degradation during processing also increases. We have thus found that by adding Radel$^R$ to a glass/polymer blend, glass loadings can be significantly increased while at the same time maintaining acceptable processing temperatures. In particular, Radel$^R$ A improved the processing conditions (torque, work, melt temperature, etc.) of the blend, thus allowing for even higher glass loadings. The effect of Radel$^R$ A on glass/polymer blends is shown in Tables 3 and 4 below.

TABLE 3

|  | K/RADEL/ULTEM (wt. %) | | | W/RADEL/ULTEM (wt. %) | |
| --- | --- | --- | --- | --- | --- |
|  | 50/21/29 | 65/10/25 | 65/17.5/17.5 | 70/10/20 | 75/8.5/16.5 |
| MECHANICALS | | | | | |
| Flex PSI | 15190 | 15706 | 12688 | 15903 | 18105 |
| Modulus MPSI | 0.82 | 1.82 | 1.24 | 1.88 | 2.47 |
| % Strain Peak Load | 3.5 | 0.9 | 1.3 | 0.9 | 0.6 |
| Tensile PSI | 8102 | 8681 | 8331 | — | 10424 |
| Modulus KSI | 1038 | 2213 | 1441 | — | 3020 |
| % Strain Break | 1.39 | 0.413 | 0.689 | — | 0.371 |
| Notched Izod | — | 0.423 | 0.689 | — | — |
| Limiting Oxygen Index | 52% | — | — | 67% | — |
| Expansion in 3D at 150° C. $\mu$m/m ° C. | 127 | 87.8 | 92 | 96.5 | 78.9 |
| x, y Ratios for Expansion Isotropy 180° C.–200° C. | 1.02 | 2.15 | 1.27 | 1.86 | 1.61 |
| Microstructure | Fine | Fine | Fine | Fine/Slight Elongation | Very Thin Structure |

TABLE 4

|  | Y/RADEL/ULTEM (wt. %) | | | | |
| --- | --- | --- | --- | --- | --- |
|  | 70/10/20 | 73/9/18 | 70/15/15 | 70/12/18 | 67/11/22 |
| MECHANICALS | | | | | |
| Flex PSI | 17830 | 14307 | 12470 | 14255 | 14161 |
| Modulus MPSI | 2.47 | 2.83 | 1.42 | 2.02 | 1.6 |
| % Strain Peak Load | 0.7 | 0.5 | 1 | 0.7 | 1 |
| Tensile PSI | 12569 | 9452 | 6969 | 9088 | 7252 |
| Modulus KSI | 2655 | 3095 | 1688 | 2135 | 1534 |
| % Strain Break | 0.529 | 0.32 | 0.453 | 0.468 | 0.515 |

TABLE 4-continued

| | Y/RADEL/ULTEM (wt. %) | | | | |
|---|---|---|---|---|---|
| | 70/10/20 | 73/9/18 | 70/15/15 | 70/12/18 | 67/11/22 |
| Limiting Oxygen Index | 94+% | — | — | — | — |
| Expansion in 3D at 150° C. μm/m ° C. | 57.9 | 71.4 | 84.4 | 85.5 | 84.2 |
| x, y Ratios for Expansion Isotropy 180° C.–200° C. | 1.44 | 1.33 | 1.24 | 1.55 | 1.19 |
| Microstructure | Very Fine Structure | Coalesced | Large Glass Spheres | — | Fine |

Surprisingly, for the inventive multi-polymer system, we have observed little or no adverse effect on the flexural and tensile strengths at higher glass loadings. Without intending to be bound by theory, it is believed that the improved flexural and tensile strengths observed in the inventive melt blends may be due to the presence of finer particle size distributions in the present blend than those found in a single polymer blend. For example, as illustrated in Tables 3 and 4, the glass/Radel/Ultem blend of the invention combines the high adhesion properties of Radel and the high physical properties of Ultem, resulting in a blend whose physical properties are better than the properties of glass/polymer blends having only a single polymer. Even at glass loadings of 65 wt. % or greater, the inventive two-polymer blends exhibit strengths equivalent to or exceeding those of two component systems. When compared to Table 2 above, it is seen that 50/50 Y/Ultem and 65/35 Y/Ultem show a decrease in both flexural and tensile strengths. By contrast, as shown in Table 4, in the inventive blend a significant increase in flex, tensile and modulus values occurs in a 70 wt. % Y blend with 10 wt. % Radel/20 wt. % Ultem.

We have further found that acceptable flexural and tensile strengths can be obtained in glass/polymer blends having 65 wt. % glass loading or higher, by combining certain polymers as processing aid with the high temperature thermosetting polymers. The resulting glass/polymer blends which can be injection molded, can be used to produce articles which are durable and dimensionally stable. In particular, we have found that by adding small amounts of a lower viscosity, high temperature processing resin, such as PEEK 150 and UDEL$^R$ 1700 (a polysulfone available from AMOCO Performance Products, Alpharetta, Ga.) as a processing aid to a glass/ULTEM 1000/RADEL R blend (70–75 wt. % glass), significant improvements in dimensional stability and processability can be achieved. The most interesting processing aids for this purpose are the aromatic polyketones such as PEKK, PEKEKK, PEK, PEEKK, PEEKEK, PEEEK and PEEEK, preferably, PEEK. We have observed marked improvements in processability by adding varying amounts of PEEK to high glass loading blends.

We have also found that in addition to improvements in dimensional stability, the use of processing aids provide significant advantages by reducing the torque extremely high glass/polymer blends can impart on the processing equipment. Thus, while glass/polymer tri-blends having 65 wt. % glass or higher can be processed without the addition of polymer processing aids, we have found that in order to obtain a steady process of glass/polymer blends having 75 wt. % glass loading or more, in some processing environments it may be desirable to add PEEK, UDEL, or a combination of these additives in the blend as processing aids. Whether or not a processing aid is needed will depend on the specific processing equipment used. For example, we found that for our specific equipment described below, extremely high glass loading blends using RADEL:ULTEM in ratios of 1:1, 2:1 and 3:1 could not be processed without the addition of either PEEK or UDEL. Therefore, in the preferred embodiments of the invention, processing aids, preferably, PEEK and UDEL are added to the blend to improve processability. Of course, the amount of these processing aids necessary will depend on such variables discussed above, example, screw design, viscosity of the blend and other variables. By extremely high glass loadings we mean glass/polymer blends containing 75 wt. % glass or higher.

To illustrate this further aspect of the invention, we attempted to compound the following two-polymer, high glass loading compositions without the processing aids and found that for our specific equipment set-up, extremely high glass loadings could not be processed.

(1) 75% glass, 12.5% ULTEM, 12.5% RADEL R Equipment set-up: screw design: #7aL34 die design: 1/5 LID die (same equipment set-up as used in the above examples). The extrudate started out with a smooth surface and a fine dense melt structure. After a short period of time the machine started to torque out. The extrudate became stiffer and darker in color. The run was aborted and the machine was purged. A second attempt was tried using a lower temperature profile but the results were the same—the amps maxed out and the machine torqued out.

(2) 75% glass, 16.7% ULTEM, 8.3% RADEL R Equipment set-up: same as composition 1. The process became unstable in less time than composition 1. The extrudate became stiffer and darker in color. The amps increased and torqued the machine out. The run was aborted.

(3) 75% glass, 8.3% ULTEM, 16.7% RADEL R

Equipment set-up: same as compositions 1 & 2. This composition torqued out the machine faster than the previous ones. The amps started out higher and very little sample was collected before the run had to be aborted.

To demonstrate the effects of UDEL and PEEK as processing aids, we compared a resin blend of ULTEM 1000/RADEL R/PEEK 150 in a ratio of 50/35/15, with a similar blend of ULTEM 1000/RADEL R/UDEL (50/35/15). The PEEK-containing blend was miscible while the UDEL-containing blend was not miscible. The PEEK blend was clear (but amber, similar to the ULTEM), while the UDEL blend was translucent. Both blends exhibited good strength and toughness. In a blend containing 75 wt. % glass, only about 3.75 wt. % PEEK or UDEL is needed. For lower glass loadings the amount of processing aid (PEEK or UDEL) needed may vary. The ratio of PEEK or UDEL to ULTEM in the blend is no greater than 1.0, preferably, in the range of 0.2 to 0.5, more preferably in the range of 0.3 to 0.4.

EXAMPLES

A) To further demonstrate the advantageous effect of Radel in the glass/polymer blend of the invention, a single polymer 65/35 Y/Ultem blend was combined in an extruder. The glass/polymer blend was intimately mixed to ensure production of essentially uniform, fine-grained microstructures which is best accomplished through high shear dispersive mixing, preferably using a twin screw extruder. The torque on the extruder ranged from about 55 to 60%. Torque in excess of 50% is generally unacceptable as it places undue stress on the equipment. By adding a small amount of Radel to form a 70/10/20 Y/Radel/Ultem tri-blend, the torque on the extruder was significantly reduced to about 40%.

B) In another example, similar advantageous effects were seen in injection molding applications using a 75/8.5/16.5 W/Radel/Ultem tri-blend. To prepare the tri-blend, Ultem pellets, significantly larger in particle size than Radel or glass, were loaded into a first feeder. Then, a mixture of Radel and glass was loaded into a second feeder. Calibrated amounts of Ultem and the Radel/glass mixture were then fed into an extruder at a calculated rate. For example, to process the 70/10/20 tri-blend, the feeders were set at a rate such that 6 grams of Ultem, 3 grams of Radel, and 21 grams of the Y glass are fed into the extruder. This was accomplished by thoroughly mixing 87.5% of the glass and 12.5% Radel in the second feeder, and calibrating this second feeder to feed the glass/Radel mixture at a rate of 24 grams per minute.

C) The following example further illustrates the beneficial effects of processing aids such as PEEK and/or UDEL. The blends for experiments 1–11 below were prepared using Glass I (Table 1), and in all cases, the resins were dried using low dew point dehumidified dry air at 150° C., for 16 hours.

The glass/polymer melt blend compositions tested are presented in Table 5 below:

TABLE 5

| Blend # | Glass Loading (wt. %) | ULTEM (wt. %) | RADEL (wt. %) | UDEL (wt. %) | PEEK (wt. %) |
|---|---|---|---|---|---|
| 1 | 70 | 20 | 10 | 0 | 0 |
| 2 | 50 | 33.5 | 16.5 | 0 | 0 |
| 3 | 60 | 26.7 | 13.3 | 0 | 0 |
| 4 | 70 | 10 | 20 | 0 | 0 |
| 5 | 60 | 13.3 | 26.7 | 0 | 0 |
| 6 | 50 | 16.5 | 33.5 | 0 | 0 |
| 7 | 75 | 12.5 | 8.75 | 3.75 | 0 |
| 8 | 65 | 17.5 | 12.5 | 5.25 | 0 |
| 9 | 70 | 15 | 10.5 | 0 | 4.5 |
| 10 | 70 | 15 | 10.5 | 4.5 | 0 |
| 11 | 75 | 12.5 | 8.75 | 0 | 3.75 |

The results of the various blends are summarized below:

Blend #1: The viscosity was very high, resulting in very high pressures and the double-strand die would torque out periodically. It was difficult to find a stable operating condition on the double-strand die. We were able to process this blend using a single strand die, but at the high end of operating conditions. The collected samples had very smooth surface, with a dense fine melt structure.

Blend #2: Initially, this blend was stable, but then the machine began to gradually torque out on the double-strand extruder. Similarly, the extrudate started out with a smooth surface and a fine dense melt structure, but later became lumpy (indicating crystallization or coalescence) as the melt temperature increased. As with Blend #1, this blend could be processed using a single-strand die at the high end of operating conditions.

Blend #3: Both feed rates and screw speeds were established long enough to collect sufficient samples for injection molding. The molded samples showed black specks and some unmelted particles. The process was unstable. As the amps began to increase, the screw speed fluctuated resulting in shut down. Again, we were able to process this composition using the less aggressive single-strand extruder.

Blend #4: The blend was started at 50% glass and gradually increased to 70 wt. %, at which loading the process became unstable. The blend viscosity was too high to process. As the amps increased, the machine torqued out and no samples were collected.

Blend ##5&6: Both blends were able to be processed for a sufficient length of time to collect extrudates for molding. Blend 5 later torqued out the extruder. In both cases, the samples were well melted with good pellet quality.

Blend #7: The process was very stable and sufficient samples were collected for molding evaluation. However, towards the end of the run, the 34 mm extruder began to torque out. The strand was very smooth and well melted.

Blend #8: Process was unstable due to high pressure, high amps and torquing out; but collected sufficient sample for molding evaluation. The sample had good melt quality, a smooth surface, and good pellet quality. Attempts to increase glass loading to 70% were unsuccessful as the machine would frequently torque out.

Blend #9: In an attempt to reduce the blend viscosity and stabilize the process, we substituted PEEK for UDEL. Even though enough samples were collected for molding evaluation, the process was still at the high end of the torque limit for the 34 mm extruder. On a less restrictive die and screw design (i.e., one designed to reduce pressure and torque respectively), the composition ran very well. It was possible to increase the feed rate and screw speeds without torquing out. The process was stable even though the amps were running at the high end. The blend had a fine melt, and the extrudate pelletilized well with good pellet quality. The strand was translucent, with a smooth surface. This blend was extruded repeatedly to verify its processability. In all cases, the material ran with stable process conditions and good devolatilization, and excellent strand quality.

Blend #10: Stable process. The samples were well melted with a dense pellet structure, and the material was well devolatilized.

Blend #11: This was the highest glass level processed under stable conditions with this resin blend. The strand and pellet quality was again excellent. The material was well devolatilized and we obtained a good glass melt and dispersion.

The process variables which may be adjusted depending on the specific blend and equipment include, die screw design, viscosity, screw speed, feed rate, and temperature profile. Significant improvements in the melt blends can be achieved by any one of a combination of steps such as, drying the resin in low dew point (−30° C.) dehumidified dry air at 150° C., modifying the screw and die design, increasing the vacuum venting capacity, or by adjusting other operating conditions. In particular, we have found that by using the inventive method, melt blends having less oxidative and less thermal degradation can be achieved. Low levels of oxidative and thermal degradation are indicated by the color of the blends. The lighter the color, the lower the level of degradation.

The properties of the glass/polymer tri-blend of the invention depends on the respective properties of the glass and the polymers. In addition, the glass/polymer properties depend on the glass loading (i.e., the ratio of glass to polymers), as well as the ratio of one polymer to the other in the blend. Thus, to provide glass/Ultem blends having good processing properties as well as good adhesion, we have found that small additions of Radel to a glass/Ultem blend, provides a tri-blend of improved adhesion and significantly improved ease of processing. Besides ease of processing and good glass/polymer adhesion, the tri-blends of the invention exhibit excellent dimensional stability, high flame retardance as measured by the limiting oxygen index, as well as good isotropic behavior. In addition, blends having significantly high glass loadings can be processed by adding Radel to a glass/Ultem blend.

Preferably, the coefficient of thermal expansion (CTE) in three directions (x, y, z), is no greater than 95 $\mu$m/m° C. As shown in Table 2, to obtain CTEs approaching this value requires glass loadings in excess of 65%. As stated earlier, due to processing limitations, it is difficult to obtain single polymer glass/polymer blends of acceptable strengths at high glass loadings. For the inventive blends shown in Tables 3 and 4, we have shown that a CTE of 90 $\mu$m/m° C. or less is readily achieved at glass loadings of 65 wt. % or greater, which glass loadings are attained by using Radel as a processing aid. Thus, by combining Radel and Ultem in the glass/polymer blends of the invention, higher glass loadings can be processed. It is believed that the low levels of Radel in such a blend acts as a processing aid for the blend. It is believed that the Radel$^R$ starts to melt sooner than the other components, and lubricates the glass. The advantageous effects of Radel in the inventive glass/polymer blends are illustrated in Example 1 below.

Thermal expansion coefficients are measured in the x, y and z directions, with the x, y directions showing the degree of isotropy. Since Ultem is an amorphous polymer, its properties are isotropic but become anisotropic as the level of filler increases. However, the inventive tri-blends are unique in that the blends remain isotropic even at high glass loadings. As used herein, an x,y ratio less than 2.0 suggests some isotropic behavior, while a ratio of less than 1.5 is deemed outstanding. The ratio of thermal expansion coefficients in the x and y directions for the glass/Radel/Ultem blends of the invention are in the range of 1.02 to 2.15. The cause of this is not known, however, we have found that blends with fine microstructure tend to be more isotropic than blends with larger glass particles.

Flame retardance is also dependent on glass loading. A significant increase in limiting oxygen index is observed with a 15 wt. % glass loading increase. Additional glass in the system, made possible by processing with Radel, will further enhance flame retardant properties. As shown in the tables above, both limiting oxygen index and dimensional stability improve as glass loading increases. Glass loadings of 65 wt. % or higher are preferred for these properties.

As described above, several advantages result from adding low levels of Radel to the glass/Ultem system. The high viscosity of Ultem restricts the glass loadings to 65 wt. % in single polymer systems. We have found that glass loadings up to 85 wt. % can be melt blended with Ultem and low levels of Radel to obtain glass/polymer blends which, in addition to having unique processing properties, exhibit such properties as good polymer/glass adhesion, high glass loadings, excellent dimensional stability, excellent flame retardance as measured by limiting oxygen index, isotropic behavior, and good strength.

We have also found that desirable properties and blend morphology of the inventive tri-blends can be obtained by varying the ratio of Radel to Ultem in the blends. For example, flexural strength, tensile strength and moduli tend to decrease as the ratio approaches 1. On the other hand, as the ratio of Radel/Ultem approaches 1, the blend toughness tends to increase. Therefore, the most appropriate Radel/Ultem ratio will depend on the desired blend properties. This will also depend on the particular glass/polymer combination.

In the above examples, the glass was compounded from oxide, carbonate, and phosphate batch materials. The batch materials were automatically tumble-mixed or ballmilled and melted in silica crucibles at temperatures in the vicinity of 1000° C. for times of about three hours. Very little volatilization of $P_2O_5$, fluoride, or other species was noted. Analyzed values of $P_2O_5$ were typically only a few tenths percent below that calculated from the batch.

In a preferred embodiment of the invention, articles of glass/polymer blend materials of the inventions were formed by:

(a) compounding glass materials from oxides, carbonates, phosphates, or their precursors to form a glass batch material;

(b) melting the glass batch material at a temperature of about 1000° C.;

(c) drying and finely-dividing the glass batch materials to form fragments or pellets of glass;

(d) combining the fragments or pellets of glass with pellets or powders of two or more organic polymers to form a glass/polymer batch;

(e) feeding the glass/polymer batch into an extruder at a temperature in the range of 300°–450° C. to form the glass/polymer blend; and optionally (f) mixing and extruding the blend into strands of materials.

More preferably, the glass/polymer blend contains at least 65 wt. % glass.

In one preferred embodiment, at least two of the polymers are polyarylsulfone and polyetherimide, and the weight ratio of polyarylsulfone:polyetherimide (in this case., RADEL:ULTEM) is in the range of 0.2 to 3.0, more preferably in the range of 0.4 to 2.

In another preferred embodiment using a processing aid, two of the polymers are polyarylethersulfone and polyetherimide and the weight ratio of the former to the latter is in the range of 0.2 to 1.2, more preferably, in the range of 0.4 to 1.0.

In a particularly preferred embodiment, the blend further includes at least one processing aid, preferably, an aromatic polyketone, more preferably, polyetheretherketone.

Where a pulverized material is desired to form feedstock for extrusion, the melts are poured through patterned metal rollers to produce ribbons having a textured surface which can be easily crushed to predetermined-sized fragments. More preferably, for such applications, the melts can be poured as a fine stream into a bath of cold water, a practice termed "drigaging." If desired, the glass particles/fragments may further be pelletized for ease of handling.

After thorough drying, the finely-divided fragments/pellets of glass and pellets or powders of organic polymer are fed into a twin screw extruder which can be programmed to operate at temperatures between about 300°–450° C., or temperatures at which the glasses exhibit a viscosity within the range of about $10^4$–$10^7$ poises. The high shear forces generated in the extruder assure very fine melt mixing at those viscosities. The so-mixed material can then be extruded into strands of spaghetti-like materials which are characterized by having substantial porosity.

If desired, the extrudate can be pelletized, thoroughly dried, and fed into an injection molding machine. Depending upon the glass composition and the polymer involved, the injection molder can be programmed to operate at temperatures ranging from about 300°–430° C. and at pressures in excess of 15,000 psi.

Articles made from the glass/polymer tri-blends of the invention are of special interest in the area of precision molded parts and products requiring high dimensional stability (i.e., dimensions as well as shape retention). Articles of the invention may also find application in the fabrication of such products as light weight, scratch resistant, and impact resistant cookware for both microwave and conventional oven use. As stated, such products will desirably exhibit dimensional stability in three directions, as well as good flame retardance as measured by the limiting oxygen index.

In addition to the embodiments discussed above, it will be clear to persons skilled in the art that numerous modifications and changes can be made to the disclosed compositions and methods without departing from the intended spirit and scope of the invention.

What is claimed is:

1. A method of making a glass/polymer blend comprising at least 65 wt. % glass, a first polymer, and a second polymer, wherein the first polymer is a poly(phenylsulfone), the method comprising:
   (a) compounding glass materials from oxides, carbonates, phosphates, or their precursors to form a glass batch material;
   (b) melting the glass batch material at a temperature of about 1000° C.;
   (c) drying and finely-dividing the glass batch materials to form fragments or pellets of glass;
   (d) combining and mixing the fragments or pellets of glass with pellets or powders of the first and second polymers to form a glass/polymer batch; and
   (e) feeding the glass/polymer batch into an extruder at a temperature in the range of 300–450° C. to form the glass/polymer blend.

2. A method according to claim 1, wherein in step (d) only one of the first and second polymers is first mixed with the glass and wherein, after thorough mixing of the glass and one of the first and second polymers, the other of the first and second polymers is subsequently added to the glass/polymer mixture to form the glass/polymer blend.

3. A method according to claim 2, wherein the subsequently added polymer acts as a processing aid for the blend.

4. A method according to claim 1, wherein the second polymer is selected from the group consisting of polyarylether ketones, polyphenylene sulfides, polyfluoro resins, polyetherimides, liquid crystal polymers, polysulfones, polyethersulfones, polytetrafluoroethylenes, polyetherketones, high temperature polycarbonates, polyetherketoneketones, polyetherketoneetherketoneketones, polyetherketoneketones, polyetherketoneetherketones, polyetheretherketones, polyetheretheretherketones, epoxy resins, phenolics, diallyl phthalates, silicone resins, and polyimides.

5. A method according to claim 1, wherein the second polymer is a polyetherimide.

6. A method according to claim 5, wherein the ratio of poly(phenylsulfone) to polyetherimide is in the range of 0.4 to 2.0.

7. A method of making a glass/polymer blend comprising at least 65 wt. % glass, a first polymer, and a second polymer, wherein the first polymer is selected from the group consisting of a poly(arylethersulfone) and a poly(phenylsulfone) and wherein the second polymer is a polyetherimide, the method comprising:
   (a) compounding glass materials from oxides, carbonates, phosphates, or their precursors to form a glass batch material;
   (b) melting the glass batch material at a temperature of about 1000° C.;
   (c) drying and finely-dividing the glass batch materials to form fragments or pellets of glass;
   (d) combining and mixing the fragments or pellets of glass with pellets or powders of the first and second polymers to form a glass/polymer batch; and
   (e) feeding the glass/polymer batch into an extruder at a temperature in the range of 300–450° C. to form the glass/polymer blend.

8. A method of making a glass/polymer blend comprising at least 65 wt. % glass, a first polymer, and a second polymer, wherein the first polymer is a poly(phenylsulfone), the method comprising:
   providing finely-divided bodies of an inorganic glass;
   providing pellets or powders of a first polymer and a second polymer, wherein the first polymer is a poly(phenylsulfone);
   mixing the finely-divided bodies of an inorganic glass and the first and second polymers to form a glass/polymer batch; and
   extruding the glass/polymer batch to form the glass/polymer blend.

9. A method according to claim 8, wherein said mixing comprises:
   mixing thoroughly only the first polymer with the finely-divided bodies of an inorganic glass and to form an intermediate glass/polymer mixture; and
   mixing the second polymer with the intermediate glass/polymer mixture to form the glass/polymer blend.

10. A method according to claim 9, wherein the second polymer acts as a processing aid for the blend.

11. A method of claim 8, wherein the second polymer is selected from the group consisting of polyarylether ketones, polyphenylene sulfides, polyfluoro resins, polyetherimides, liquid crystal polymers, polysulfones, polyethersulfones, polytetrafluoroethylenes, polyetherketones, high temperature polycarbonates, polyetherketoneketones, polyetherketoneetherketoneketones, polyetherketoneketones, polyetherketoneetherketones, polyetheretherketones, polyetheretheretherketones, epoxy resins, phenolics, diallyl phthalates, silicone resins, and polyimides.

12. A method of making a glass/polymer blend comprising at least 65 wt. % glass, a first polymer, and a second polymer, wherein the first polymer is selected from the group consisting of a poly(arylethersulfone) and a poly(phenylsulfone) and wherein the second polymer is a polyetherimide, the method comprising:
   providing finely-divided bodies of an inorganic glass;
   providing pellets or powders of a first polymer and a second polymer, wherein the first polymer is selected from the group consisting of a poly(arylethersulfone)

and a poly(phenylsulfone) and wherein the second polymer is a polyetherimide;

mixing the finely-divided bodies of an inorganic glass and the first and second polymers to form a qlass/polymer batch; and extruding the qlass/polymer batch to form the qlass/polymer blend.

13. A method according to claim 8, wherein the second polymer is a polyetherimide.

14. A method according to claim 7, wherein in step (d) only the first polymer is first mixed with the glass and wherein, after thorough mixing of the glass and the first polymer, the second polymer is subsequently added to the glass/polymer mixture to form the glass/polymer blend.

15. A method according to claim 14, wherein the subsequently added polymer acts as a processing aid for the blend.

16. A method according to claim 7, wherein the first polymer is a polyarylethersulfone.

17. A method according to claim 16, wherein the ratio of polyarylethersulfone to polyetherimide is in the range of 0.4 to 2.0.

18. A method according to claim 12, wherein said mixing comprises:

mixing thoroughly only the first polymer with the finely-divided bodies of an inorganic glass to form an intermediate glass/polymer mixture; and mixing the second polymer with the intermediate glass/polymer mixture to form the glass/polymer blend.

19. A method according to claim 18, wherein the second polymer acts as a processing aid for the blend.

20. A method according to claim 12 wherein the first polymer is a polyarylethersulfone.

* * * * *